United States Patent
Huo

(10) Patent No.: US 11,698,752 B2
(45) Date of Patent: Jul. 11, 2023

(54) RETRANSMITTING MESSAGES BASED ON COMMAND QUEUE DEPTH IN A MEMORY SUBSYSTEM

(71) Applicant: Micron Technology, Inc., Boise, ID (US)

(72) Inventor: Binbin Huo, Sauerlach (DE)

(73) Assignee: MICRON TEHCNOLOGY, INC., Boise, ID (US)

( * ) Notice: Subject to any disclaimer, the term of this patent is extended or adjusted under 35 U.S.C. 154(b) by 0 days.

(21) Appl. No.: 17/111,407

(22) Filed: Dec. 3, 2020

(65) Prior Publication Data

US 2022/0179584 A1 Jun. 9, 2022

(51) Int. Cl.
 *G06F 3/06* (2006.01)
(52) U.S. Cl.
 CPC .......... *G06F 3/0659* (2013.01); *G06F 3/0604* (2013.01); *G06F 3/0679* (2013.01)
(58) Field of Classification Search
 CPC .... G06F 3/0659; G06F 3/0604; G06F 3/0679; G06F 3/0688; G06F 3/061
 See application file for complete search history.

(56) References Cited

U.S. PATENT DOCUMENTS

| | | | |
|---|---|---|---|
| 8,775,720 B1* | 7/2014 | Meyer | G06F 3/0659 711/E12.019 |
| 9,491,261 B1* | 11/2016 | Shagam | H04L 67/133 |
| 2018/0095915 A1* | 4/2018 | Prabhakar | H04L 49/9005 |
| 2020/0057581 A1* | 2/2020 | Choi | G06F 3/0611 |
| 2020/0234159 A1* | 7/2020 | Craig | G06F 3/0659 |
| 2020/0379791 A1* | 12/2020 | Tsirkin | G06F 3/0604 |
| 2021/0303173 A1* | 9/2021 | Wu | G06F 3/0611 |
| 2021/0303206 A1* | 9/2021 | Saxena | G06F 12/10 |
| 2021/0397365 A1* | 12/2021 | Kim | G06F 3/0611 |

* cited by examiner

*Primary Examiner* — Charles Rones
*Assistant Examiner* — Tong B. Vo
(74) *Attorney, Agent, or Firm* — Nicholson De Vos Webster & Elliott LLP

(57) ABSTRACT

A method and system for retransmitting messages in a memory subsystem are described. A message is transmitted to a host system. A response message is expected to be received from the host system in response to the message. A determination that the response message was not received prior to detecting an indication of a processing of a number of commands from the host system is performed. The message is retransmitted to the host system in response to the determination.

20 Claims, 4 Drawing Sheets

RETRANSMITTING MESSAGES BASED ON COMMAND QUEUE DEPTH IN A MEMORY SUBSYSTEM

TECHNICAL FIELD

The present disclosure generally relates to retransmission of messages in memory subsystems, and more specifically, relates to retransmitting messages based on command queue depth in a memory subsystem.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
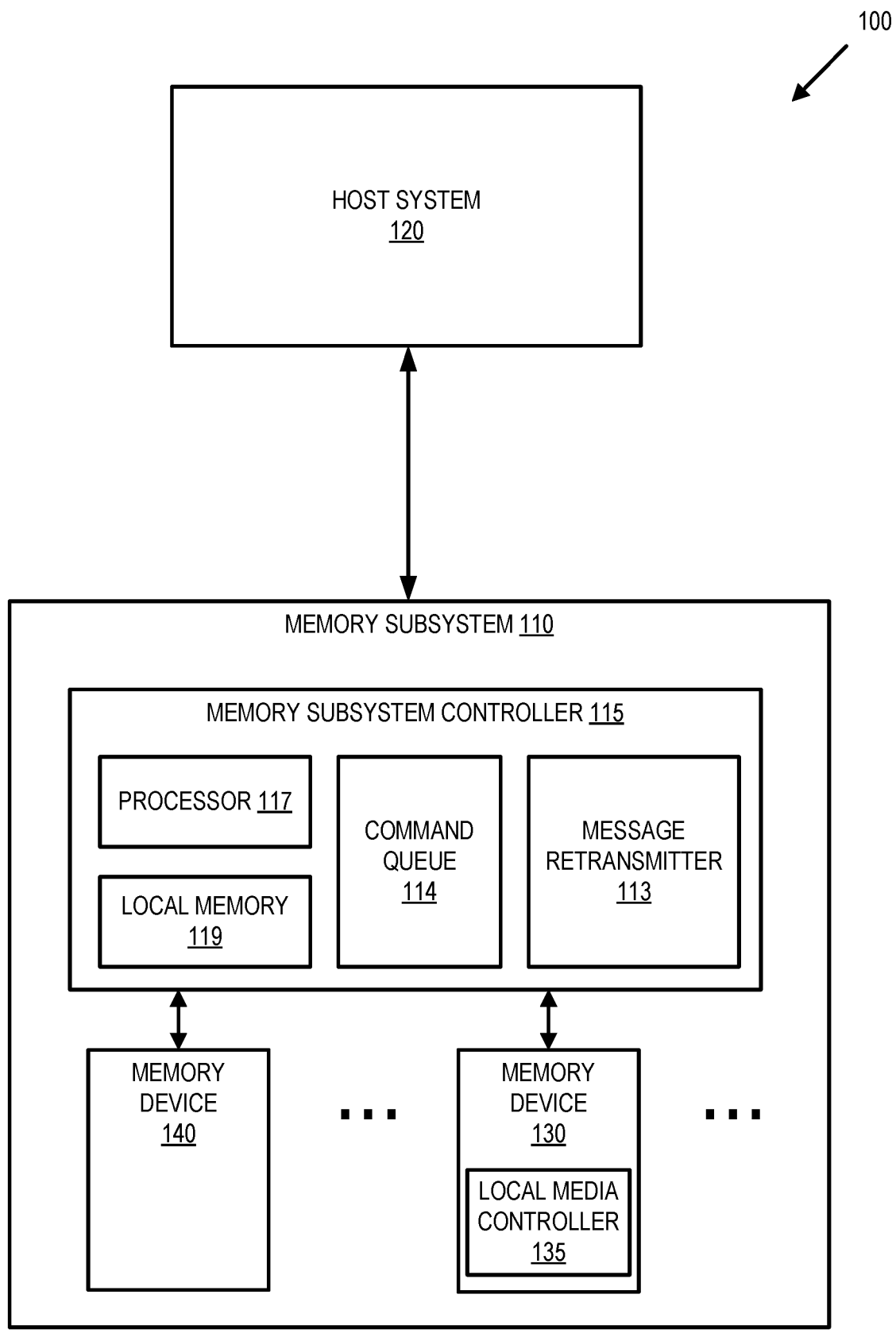
FIG. 1 illustrates an example computing system that includes a memory subsystem in accordance with some embodiments of the present disclosure.

Aspects of the present disclosure are directed to retransmitting messages based on command queue depth in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

A memory subsystem sends one or more messages to a host system. In some instances, the memory subsystem expects to receive a response message from the host system in response to the message. The response message can include a command to access a memory device or feedback for the message sent to the host system. For example, the feedback can be an acknowledgement or a message similar to a message exchanged during a handshake communication between the memory subsystem and the host system. In some cases, the host system does not send the command. Typically, a host system that receives the message sends to the memory subsystem the response message, however, in some cases the host system fails to timely transmit the response message or the memory subsystem fails to receive the response message. For example, the host system 1) may have missed or lost the message; 2) could not send the response message in a timely manner as it is busy processing other tasks (e.g., the host system can be busy processing tasks with a higher priority than the task of the message received from the memory subsystem); or 3) the response message is transmitted by the host system but it is not received by the memory subsystem. When the memory subsystem does not receive the response message, it retransmits the message.

In a non-limiting example, a memory subsystem can transmit to the host system a recommendation message to recommend to the host system to read/load a logical to physical (L2P) mapping table. However, the host can be busy processing other higher priority tasks and cannot timely issue an L2P mapping table read command in response to the recommendation from the memory subsystem. Alternatively, the recommendation message can be missed by the host system. Following the transmission of the recommendation message, the memory subsystem expects to receive from the host side an L2P mapping table read command. If the memory subsystem does not receive a read command from the host system, the memory subsystem retransmit the recommendation message.

A memory subsystem can continually retransmit the message until the response message is received from the host system. The continued transmission of messages to the host system, however, has an impact on the host system's throughput and causes an interrupt storm. The interrupt storm blocks the host system from handling urgent tasks. Further, this approach does not take into consideration the scenarios where the message was in fact captured by the host system and the host system has temporarily deferred processing of the message and transmission of the response but will eventually do both.

A memory subsystem can defer the retransmission of the message for some time period. However, it is challenging to choose a reasonable waiting time for retransmitting the message. If the time period chosen for retransmission of the message is too short, this can cause the interrupt storm as described above. Alternatively, if the time period chosen is too long, the delay in the receipt of the response message can impact the performance of the memory subsystem. For example, if the response message is a command to read L2P table entries, the delay in the receipt of the response message affects the read performance as the L2P entries are not timely loaded and the host system does not have an accurate copy of the L2P table of a memory device managed by the memory subsystem.

Aspects of the present disclosure address the above and other deficiencies by retransmitting a message upon detection of an indication of the processing of a number of commands from the host system. As a result, the message is retransmitted to enable the memory subsystem to receive a response without overwhelming the host system and without causing a disruption of the host system's throughput with an interrupt storm. For example, the memory subsystem can use expiration of a time as the indication. In some embodiments, the time period is an estimate of the amount of time to process commands from an entire command queue. In another example, the memory subsystem can use a count of commands from a command queue reaching a threshold count as the indication. In some embodiments, the threshold count is equal to the command queue depth.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes message retransmitter 113 that can efficiently and timely retransmit messages to the host system. In some embodiments, the controller 115 includes at least a portion of the message retransmitter 113. For example, the controller 115 can include a processor 117 (processing device) configured to execute instructions stored in local memory 119 for performing the operations described herein. In some embodiments, a message retransmitter 113 is part of the host system 110, an application, or an operating system. In some embodiments, the memory devices 130 can be managed memory devices (e.g., managed NAND), which is a raw memory device combined with a local controller 135 for memory management within the same memory device package. A local controller 135 can include the message retransmitter 113.

The message retransmitter 113 can retransmit one or more messages to a host system. In particular the message retransmitter 113 can retransmit message(s) to a host system upon detection of an indication of the processing of a number of commands from the host system. Further details with regards to the operations of the message retransmitter 113 are described below.

The memory subsystem 110 includes a command queue 114. In some embodiments, the command queue can be implemented in local memory 119. The command queue stores commands/requests/tasks received from the host system 120. Thus, the command queue is used by the memory subsystem 110 to enqueue commands from the host system 120 for processing. The commands stored in the command queue can include commands to access one or more of the memory devices 140 and/or 130. For example, a command can be a read or write operation. The command queue can have an associated depth (also referred to as command queue depth, queue depth). The queue depth represents a total number of commands/requests/tasks that can be added to the command queue from the host system 120. For example, the queue depth can be N, representing N total number of commands that can be transmitted from the host system to the memory subsystem for processing.

In some embodiments, when the memory subsystem completes a command in the command queue, the host system can enqueue a new command in the command queue. For example, when a command is completed, a slot that is associated with the completed task is marked free, indicating to the host system that it can enqueue a new command in the command queue. In some embodiments, when the command queue is full (i.e., there is no free slot in the command queue), a new command in the host system will remain pending until there is a free slot in the command queue.

Figure 2:
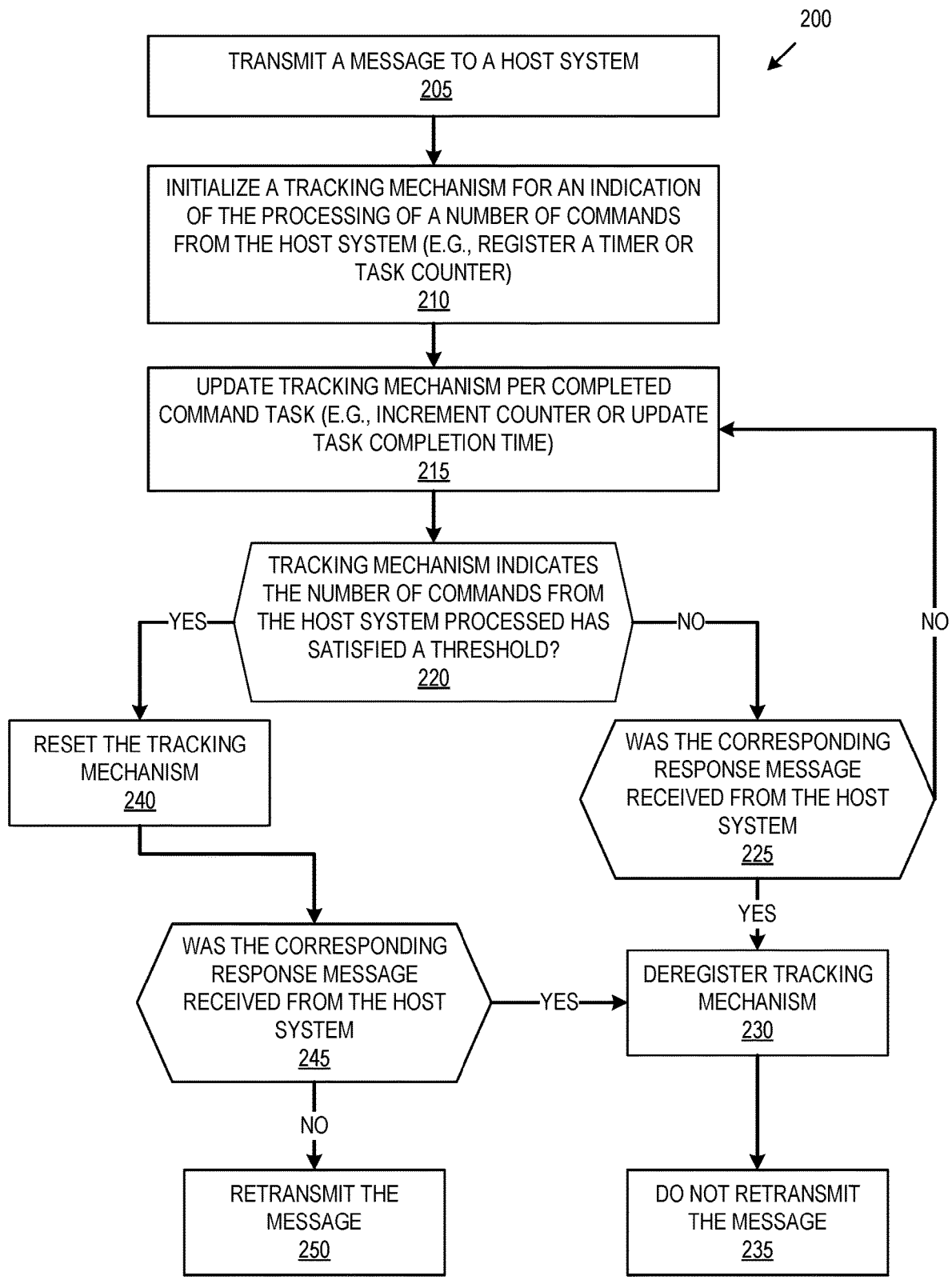
FIG. 2 is a flow diagram of an example method 200 to retransmit a message to a host system, in accordance with some embodiments of the present disclosure.

FIG. 2 is a flow diagram of an example method 200 to retransmit a message to a host system, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the message retransmitter 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing device transmits a message to a host system. A response message is expected to be received in response to the message. For example, the memory subsystem 110 transmits a message to the host system 120 and a response message is expected to be received from the host system 120 in response to the message. In some embodiments, the message can be a recommendation to access a memory device (e.g., memory device 140 or memory device 130). For example, the recommendation can be for loading/reading one or more L2P table entries from a memory device. In response to the recommendation, the memory subsystem expects to receive a load/read command from the host system 120. In some embodiments, the response to the message can include feedback from the host system. In some embodiments, the feedback can be an acknowledgement or a confirmation/response from the host system similar to a message exchanged during a handshake communication.

At operation 210, the processing device initializes a tracking mechanism for an indication of the processing of a number of commands from the host system. The tracking mechanism is associated with the transmitted message. While embodiments herein are described with reference to a tracking mechanism initialized for a transmitted message, in some embodiments, the processing device may transmit several messages for which a response is expected and may initialize several tracking mechanisms. A corresponding tracking mechanism from the initialized tracking mechanisms can be initialized for each one of the transmitted messages.

In some embodiments, initializing the tracking mechanism includes registering and starting a task counter (also referred to herein as a counter). The counter counts the number of commands that are executed and completed for the host system. For example, the counter counts, following the transmission of the message, the number of commands from the command queue that are completed by the memory subsystem.

In some embodiments, initializing the tracking mechanism can include registering and initializing a timer. The timer is set to expire after a period of time. In some embodiments, the period is an estimate of the amount of time to process a number of commands from a command queue of the memory subsystem. In some embodiments, the period is an estimate of the amount of time to process commands from an entire command queue. For example, when the command queue depth is N, the period is an estimate of the amount of time to process N commands.

At operation 215, the processing device updates the tracking mechanism per completed operation. In some embodiments, updating the tracking mechanism includes updating the task counter. The counter is incremented when execution of a command task is completed at the memory subsystem. Completing a command task may include completing execution of an operation/command included in the command queue 114 and removing the operation/command from the command queue 114. For example, when the memory controller 115 determines that an operation/command is removed/cleared from the commend queue, the counter is incremented. The counter can be incremented by one for completion of execution of a command. In some examples, completion of execution of several operations/commands can occur substantially simultaneously and incrementing the counter is performed according to the number of executions that are completed. In a non-limiting example, when execution of M commands is completed, the counter is incremented by M. In some embodiments, when multiple counters are initialized for corresponding messages, the multiple counters are incremented when commands/operations are completed. In these embodiments, when the processing device determines that an operation/command is completed, it increments the multiple counters by one.

In some embodiments, updating the tracking mechanism includes updating a command task completion time. A command task completion time is an amount of time spent for execution of a command from the command queue 114. In some embodiments, updating the tracking mechanism is an optional operation and can be skipped. The command task completion time can be used to update the period for the timer. For example, the processing device can record the amount of time spent for execution of a command in the command queue and update the period based on the recorded amount of time. Several mechanisms can be used for updating the period based on the command task completion time. In one example, the processing device can determine the mean time value for completing execution of a command and multiply the mean time value by the command queue depth to obtain the period for the timer. Several mechanisms can be used for determining the mean time value. In one embodiment, the processing device 1) tracks the lowest time spent for processing a task and the longest time spent for processing another task; and 2) determine an average of the lowest time spent and the longest time spent (by adding the two times and dividing by two) to obtain the mean time value. In one embodiment, the processing device 1) tracks the time spent for processing N commands from the command queue (where N is the queue depth); and 2) determines the average of these time values (by adding the N time values and dividing by N) to obtain the mean time value. In some embodiments, a rolling average of the time spent for processing commands from the command queue can be used as the mean time value.

At operation 220, the processing device determines if the tracking mechanism indicates that the number of commands from the host system processed has reached a threshold. In some embodiments, determining if the tracking mechanism indicates that the number of commands from the host system processed has reached a threshold includes detecting an indication of the processing of a number of commands from the host system. As described above, detecting the indication can include determining that the period has expired. For example, when the period expires (e.g., the timer associated with the transmitted message times-out), the processing device determines that the indication is detected.

In one embodiment, detecting the indication includes determining that a count of commands from a command queue has reached or otherwise satisfied a threshold count. The count of commands is a count of commands that are processed following the transmission of the message. In some embodiments, the threshold count is equal to the command queue depth. For example, when the queue depth is N, the threshold count is N. In this example, when the number of commands processed following the transmission of the message reaches N, the processing device determines that the indication is detected.

If the tracking mechanism does not indicate that the number of commands from the host system processed has reached the threshold, the method proceeds to operation 225.

If the tracking mechanism indicates that the number of commands from the host system processed has reached the threshold, the method proceeds to operation 240.

At operation 225, the processing device determines if the corresponding response message was received from the host system. The corresponding response message is a response message that is to be received from the host system in response to the message. For example, when the message includes a recommendation to load one or more L2P table entries, a response message is the load L2P table entries that corresponds to the recommendation. When the recommendation is associated with a block of a memory device, e.g., memory device 130, the response message includes a load L2P table command for that block.

If the processing device determines that the response message was not received, the method proceeds to operation 215. At operation 215, the operations are repeated and the tracking mechanism can be updated as per completed command task(s) as described above. In some embodiments, this causes the counter to be incremented until a response message is received or the counter reaches the threshold count. If the processing device determines that the response message was received, the method proceeds to operation 230.

At operation 230, the processing device deregisters the tracking mechanism. The processing device deregisters the tracking mechanism that is associated with the message. When more than one messages are transmitted to the host system and multiple tracking mechanisms have been initialized, e.g., a corresponding mechanism for each message, the mechanism that is associated with the message for which a response is received is deregistered while other tracking mechanisms can be maintained. For example, when a counter is associated with a message, the counter for that message is deregistered (and is no longer incremented). If there are other counters associated with other messages transmitted to the host system 120, the counters are not deregistered and continue to be incremented based on completed command tasks or until response messages are received for these other messages. In another example, when a timer is associated with a message, the timer for that message is deregistered (and is no longer decreased). If there are other timers associated with other messages transmitted to the host system 120, the timers are not deregistered and continue to decrease until the time period expires or until response messages are received for these other messages. The method proceeds to operation 235.

At operation 235, the processing device does not retransmit the message. Thus, when the response message is received for the message before detection of an indication of processing of a number of commands from the host system, the message is not retransmitted. For example, if a response message is received for the message before the associated counter reaches the threshold count, the message is not retransmitted. In another example, if a response message is received before expiration of the timer, the message is not retransmitted.

At operation 240, the processing device resets the tracking mechanism. Thus, when it is determined that the tracking mechanism indicates that the number of commands from the host system processed has reached a threshold, the tracking mechanism is reset. For example, resetting the tracking mechanism allows the tracking mechanism to be used for another or a retransmitted message. In some embodiments, the processing device resets the counter such that a count of the number of command tasks completed is restarted. When it is determined that the number of commands processed since the message was sent has reached a threshold count, the counter is reset. For example, the counter is reset to an initial counter value such as zero. In some embodiments the processing device resets the timer such that the timer is restarted and is to expire after the period of time. Thus, when it is determined that the timer has expired since the message was sent, the timer is reset. The timer is restarted and starts decreasing from the time period.

In some embodiments, operation 240 is optional and can be skipped. In some of these embodiments, when the method proceeds to operation 250 at which the message is retransmitted, the method may further proceed to operation 210, at which a tracking mechanism is initialized for the retransmitted message.

At operation 245, the processing device determines if the corresponding response message was received from the host system. If the processing device determines that the response message was not received, the method proceeds to operation 250. If the processing device determines that the response message was received, the method proceeds to operation 230 for deregistering the tracking mechanism. Operation 230 is performed as discussed above.

At operation 250, the processing device retransmits the message (e.g., a recommendation to the host system to access the memory subsystem and load one or more L2P tables). In one embodiment, the processing device appends the retransmitted message to a response to a command or message received from the host system. The host system will parse the response and detect the retransmitted message. The processing device expects to receive a response message from the host system in response to the retransmitted message. In some embodiments, operations from the operations 215-250 can be performed for the retransmitted message. In some embodiments, the processing device can retransmit the message several times according to the indication of the processing of a number of commands from the host system until a response message is received from the host system. In some embodiments, the processing device limits retransmission of the message to a predetermined number of times after which the processing device stops retransmitting the message regardless of whether the response message is received or not from the host system 120.

Figure 3:
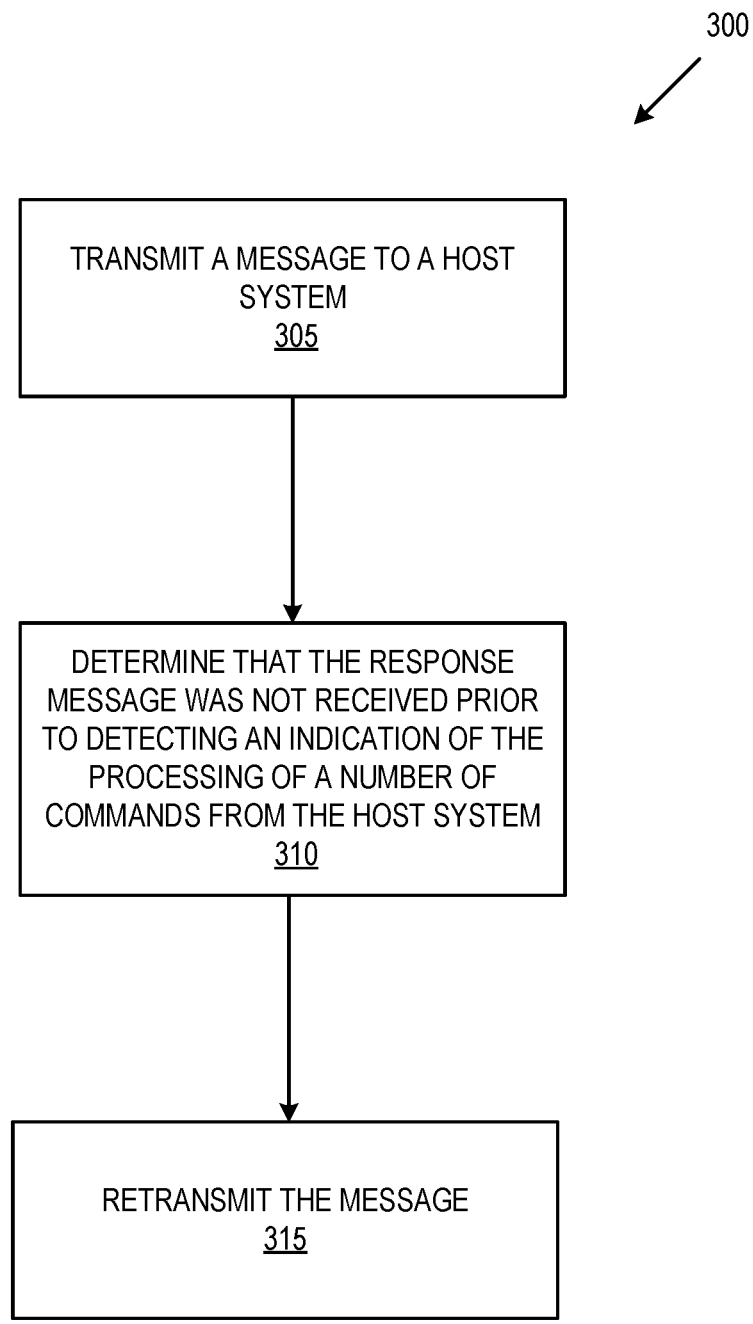
FIG. 3 is a flow diagram of another example method 300 to retransmit a message to a host system, in accordance with some embodiments of the present disclosure.

FIG. 3 is a flow diagram of an example method 300 to retransmit a message to a host system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the message retransmitter 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, similar to operation 205 described above, the processing device transmits a message to a host system.

At operation 310, the processing device determines that a response message was not received prior to detecting an indication of the processing of a number of commands from the host system. In one embodiment, detecting the indication includes determining that a time period has expired. In some embodiments, the period is an estimate of the amount of time to process commands from an entire command queue that includes the commands from the host system. When the command queue is of depth N, the period is an estimate of the amount of time it takes to process N commands. In this example, when the period expires (e.g., the timer times-out), the processing device determines that the indication is detected.

In one embodiment, detecting the indication includes determining that a count of commands from a command queue has reached or otherwise satisfied a threshold. The count of commands is a count of commands that are processed following the transmission of the message. In some embodiments, the threshold count is equal to the command queue depth. For example, when the queue depth is N, the threshold count is N. In this example, when the number of commands processed following the transmission of the message reaches N, the processing device determines that the indication is detected. In some embodiments, the threshold count is equal to the number of commands that are stored in the command queue for processing by the memory subsystem when the message is transmitted.

At operation 315, the processing device retransmits the message in response to the determined performed at operation 310. The operations 300 of FIG. 3 can be repeated for the retransmitted message until the response message is received or until the message has been retransmitted a predetermined number of times.

Figure 4:
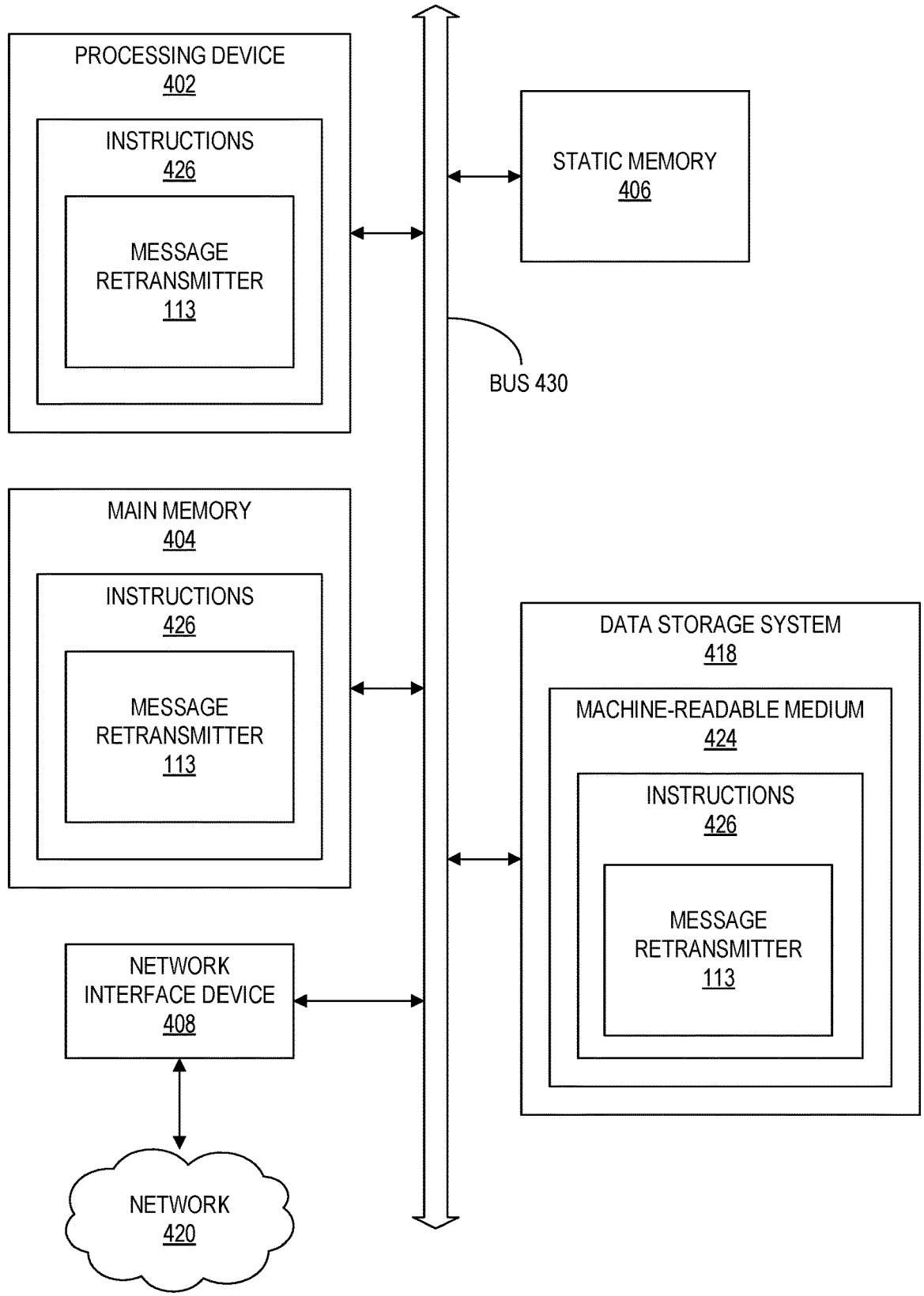
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the message retransmitter 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory subsystem 110 of FIG. 1.

In one embodiment, the instructions 426 include instructions to implement functionality corresponding to a message retransmitter (e.g., the message retransmitter 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented method(s) 200, and 300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    transmitting, by a memory subsystem, a message to a host system, wherein a response to the message is expected to be received from the host system;
    detecting an indication that the host system is processing a number of commands, wherein the number of commands is a number of commands the host is processing at a time of the transmission of the message;
    initializing a tracking mechanism based on the indication, wherein the tracking mechanism tracks the host system processing the number of commands;
    determining that the expected response was not received; and
    retransmitting the message to the host system in response to the determination and the tracking mechanism satisfying a threshold value,
    wherein the message comprises a recommendation that the host system read a logical to physical mapping table from the memory subsystem.

2. The method of claim 1, wherein the tracking mechanism satisfying the threshold value comprises an expiration of a time period.

3. The method of claim 2, wherein the time period is an estimate of an amount of time for the host system to process a command queue of the memory subsystem including the number of commands.

4. The method of claim 3, further comprising:
    determining an amount of time spent by the host system executing a command in the command queue; and
    updating the time period based on the determined amount of time spent.

5. The method of claim 1, wherein the tracking mechanism satisfying the threshold value comprises a count of the number of commands from a command queue of the host system satisfying a threshold count, wherein the number of commands are processed following the transmission of the message to the host system.

6. The method of claim 5, wherein the threshold count is equal to a depth of the command queue.

7. The method of claim 1, wherein the response includes a command for accessing a memory device.

8. A non-transitory computer-readable storage medium comprising instructions that, when executed by a processing device, cause the processing device to:
    transmit, by a memory subsystem, a message to a host system, wherein a response to the message is expected to be received from the host system;
    detecting an indication that the host system is processing a number of commands;
    initialize a tracking mechanism based on the indication, wherein the tracking mechanism tracks the host system processing the number of commands, wherein the number of commands is a number of commands the host is processing at a time of the transmission of the message;
    determine that the expected response was not received; and
    retransmit the message to the host system in response to the determination and the tracking mechanism satisfying a threshold value,
    wherein the message comprises a recommendation that the host system read a logical to physical mapping table from the memory subsystem.

9. The non-transitory computer-readable storage medium of claim 8, wherein the tracking mechanism satisfying the threshold value comprises an expiration of a time period.

10. The non-transitory computer-readable storage medium of claim 9, wherein the time period is an estimate of an amount of time for the host system to process a command queue of the memory subsystem including the number of commands.

11. The non-transitory computer-readable storage medium of claim 10, wherein the processing device is further to:

determine an amount of time spent by the host system executing a command in the command queue; and update the time period based on the determined amount of time spent.

12. The non-transitory computer-readable storage medium of claim 8, wherein the tracking mechanism satisfying the threshold value comprises a count of the number of commands from a command queue of the host system satisfying a threshold count, wherein the number of commands are processed following the transmission of the message to the host system.

13. The non-transitory computer-readable storage medium of claim 12, wherein the threshold count is equal to a depth of the command queue.

14. The non-transitory computer-readable storage medium of claim 8, wherein the response includes a command for accessing a memory device.

15. A system comprising:

a memory device; and a processing device, operatively coupled with the memory device, to:

transmit a message to a host system, wherein a response to the message is expected to be received from the host system;

detecting an indication that the host system is processing a number of commands;

initialize a tracking mechanism based on the indication, wherein the tracking mechanism tracks the host system processing the number of commands, wherein the number of commands is a number of commands the host is processing at a time of the transmission of the message;

determine that the expected response was not received; and retransmit the message to the host system in response to the determination and the tracking mechanism satisfying a threshold value, wherein the message comprises a recommendation that the host system read a logical to physical mapping table from the memory subsystem.

16. The system of claim 15, wherein the tracking mechanism satisfying the threshold value comprises an expiration of a time period.

17. The system of claim 16, wherein the time period is an estimate of an amount of time for the host system to process a command queue of the memory device including the number of commands.

18. The system of claim 17, wherein the processing device is further to:

determine an amount of time spent by the host system executing a command in the command queue; and update the time period based on the determined amount of time spent.

19. The system of claim 15, wherein the tracking mechanism satisfying the threshold value comprises a count of the number of commands from a command queue of the host system satisfying a threshold count, wherein the number of commands are processed following the transmission of the message to the host system.

20. The system of claim 19, wherein the threshold count is equal to a depth of the command queue.

* * * * *